(12) United States Patent
O'Donnell

(10) Patent No.: US 11,174,043 B1
(45) Date of Patent: Nov. 16, 2021

(54) SYSTEMS AND METHODS FOR THRUST REVERSER CORROSION DAMAGE REPAIR

(71) Applicant: Nextant Aerospace, Cleveland, OH (US)

(72) Inventor: Mark O'Donnell, Cleveland, OH (US)

(73) Assignee: Nextant Aerospace, Cleveland, OH (US)

( * ) Notice: Subject to any disclaimer, the term of this patent is extended or adjusted under 35 U.S.C. 154(b) by 0 days.

(21) Appl. No.: 17/182,787

(22) Filed: Feb. 23, 2021

Related U.S. Application Data

(60) Provisional application No. 63/130,090, filed on Dec. 23, 2020.

(51) Int. Cl.
*B64F 5/40* (2017.01)
*B23P 6/04* (2006.01)

(52) U.S. Cl.
CPC . *B64F 5/40* (2017.01); *B23P 6/04* (2013.01)

(58) Field of Classification Search
CPC .. B23P 6/002; B23P 6/005; B23P 6/04; B23P 6/045; Y10T 29/49318; Y10T 29/49737; Y10T 29/49735; Y10T 29/49734; Y10T 29/49739; B64F 5/40; F05D 2230/80; F05B 2230/80
See application file for complete search history.

(56) References Cited

U.S. PATENT DOCUMENTS

| | | | | |
|---|---|---|---|---|
| 4,517,038 A | * | 5/1985 | Miller | B29C 73/10 156/94 |
| 5,023,987 A | * | 6/1991 | Wuepper | B23P 6/00 156/98 |
| 7,981,519 B2 | | 7/2011 | Holland et al. | |
| 8,916,011 B2 | * | 12/2014 | Holland | B64D 29/00 156/98 |
| 9,649,728 B2 | * | 5/2017 | Nasserrafi | B21D 47/04 |
| 10,239,300 B2 | * | 3/2019 | Joslyn | B29C 73/02 |
| 10,265,915 B2 | | 4/2019 | Urban | |
| 2007/0240819 A1 | * | 10/2007 | Bogue | B29C 73/04 156/307.7 |
| 2008/0226818 A1 | * | 9/2008 | Bernus | B29C 73/32 427/140 |
| 2013/0288210 A1 | * | 10/2013 | Stewart | G06Q 10/0875 434/219 |

* cited by examiner

*Primary Examiner* — Jason L Vaughan
(74) *Attorney, Agent, or Firm* — Proskauer Rose LLP

(57) ABSTRACT

Systems and methods for repairing corrosion damage of a part of a thrust reverser assembly. The method includes removing the part having an inner surface and an outer surface. The method also includes removing an outer skin from the inner surface and the outer surface of the part. The method further includes installing a ply of synthetic fiber material onto an area of the inner surface or the outer surface of the part. The method also includes installing one or more doublers onto the ply of synthetic fiber material and heat curing layers of film adhesive. The method further includes applying an edge seal to gaps between the one or more doublers and the inner surface or outer surface of the part. The method also includes installing the outer skin to the inner surface and the outer surface of the part and installing the part to the thrust reverser assembly.

9 Claims, 4 Drawing Sheets

SYSTEMS AND METHODS FOR THRUST REVERSER CORROSION DAMAGE REPAIR

CROSS REFERENCE TO RELATED APPLICATION

This application claims the benefit of priority to U.S. Provisional Patent Application No. 63/130,090, filed Dec. 23, 2020, the entire contents of which are owned by the assignee of the instant application and incorporated herein by reference in its entirety.

FIELD OF THE INVENTION

The present invention relates generally to systems and methods for repairing corrosion damage, including systems and methods for repairing corrosion damage of thrust reverser systems.

BACKGROUND OF THE INVENTION

Airplane parts are often repaired with approval from a Federal Aviation Administration ("FAA") Designated Engineering Representative ("DER"). DERs are responsible for finding that engineering data complies with the appropriate airworthiness standards. Many airplane parts include thin metal layers that may be used as an outer skin. Over time, these thin metal layers suffer from corrosion damage that need to be addressed in order to meet FAA regulations. However, corrosion damage has been found to be difficult to repair, requiring complete replacement of the part.

For example, once corrosion damage has been identified after inspection of an airplane's parts, those parts have to be replaced before the airplane is certified for use. Replacing airplane parts can often be prohibitively costly and time consuming. Therefore, there is a need for improved methods and systems to perform repairs of corrosion damage on airplane parts that meet the requirements of FAA certification.

SUMMARY OF THE INVENTION

Accordingly, an object of the invention is to provide users with systems and methods for repairing corrosion damage to an airplane part. Specifically, it is an object of the invention to provide users with systems and methods to permit the user to repair corrosion damage of a part of a thrust reverser assembly. It is an object of the invention to permit the user to repair corrosion damage of a part of a thrust reverser assembly, such that the requirements of FAA certification are met.

In some aspects, a method for repairing corrosion damage of a part of a thrust reverser assembly includes removing the part of the thrust reverser assembly. The part includes an inner surface and an outer surface. The method also includes removing an outer skin from the inner surface and the outer surface of the part. Further, the method includes installing a ply of synthetic fiber material onto an area of the inner surface or the outer surface of the part. The area having corrosion damage. The ply of synthetic fiber material being sandwiched between a layer of film adhesive on each side of the ply of synthetic fiber material.

The method also includes installing one or more doublers onto the ply of synthetic fiber material. Further, the method includes heat curing the layers of film adhesive. The method also includes applying an edge seal to gaps between the one or more doublers and the inner surface or outer surface of the part. Further, the method includes installing the outer skin to the inner surface and the outer surface of the part. The method also includes installing the part to the thrust reverser assembly.

In some embodiments, the part is one of an upper door assembly or a lower door assembly. In some embodiments, the synthetic fiber material includes one of a Plain Weave Kevlar or a 4-Harness Kevlar. Kevlar® is a registered trademark of DuPont de Nemours, Inc., and is DuPont's brand name for its synthetic fiber material. In some embodiments, the one or more doublers are installed using rivets. In some embodiments, the method includes painting a topcoat to the inner surface and the outer surface of the part.

In other embodiments, the method includes heat curing the layers of film adhesive by ramping up a temperature of the film adhesive up to 250 degrees F., dwelling at the temperature of 250 degrees F. for an hour, and ramping down the temperature of the film adhesive to a room temperature.

In some embodiments, the edge seal includes a resin. For example, in some embodiments, the method includes heat curing the edge seal resin. In some embodiments, the method includes sanding an excess of edge seal resin.

In some embodiments, the method includes clamping the one or more doublers onto the part, identifying locations for doubler holes, and reaming the locations for doubler holes.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for repairing corrosion damage to an airplane part. The system and methods can include one or more mechanisms or methods for repairing corrosion damage of a part of a thrust reverser assembly. The systems and methods described herein can permit a user to repair corrosion damage of a part of a thrust reverser assembly, such that the requirements of FAA certification are met.

Figure 1:
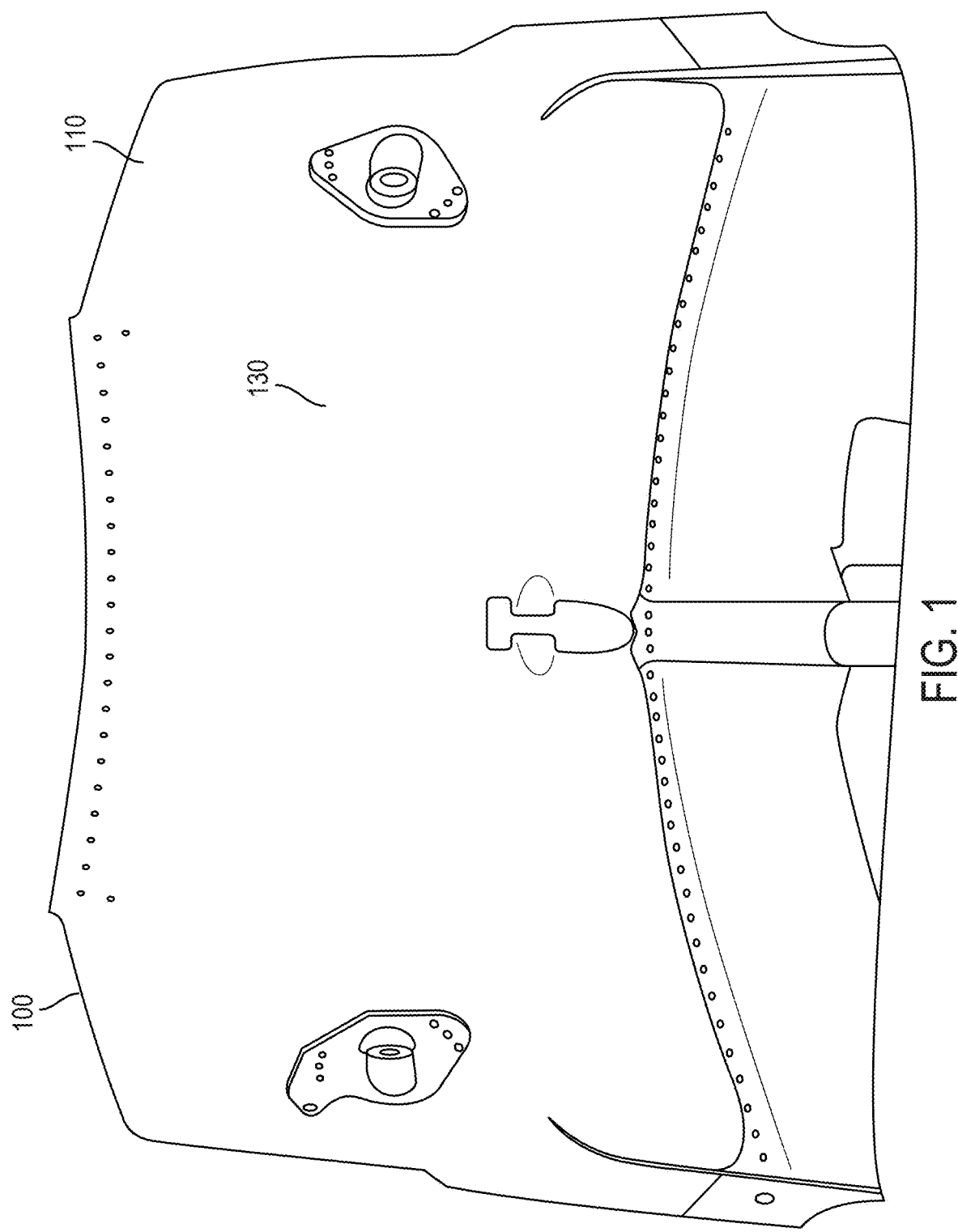
FIG. 1 is an isometric view of an exemplary part of a thrust reverser assembly, according to an embodiment of the invention.
Figure 2:
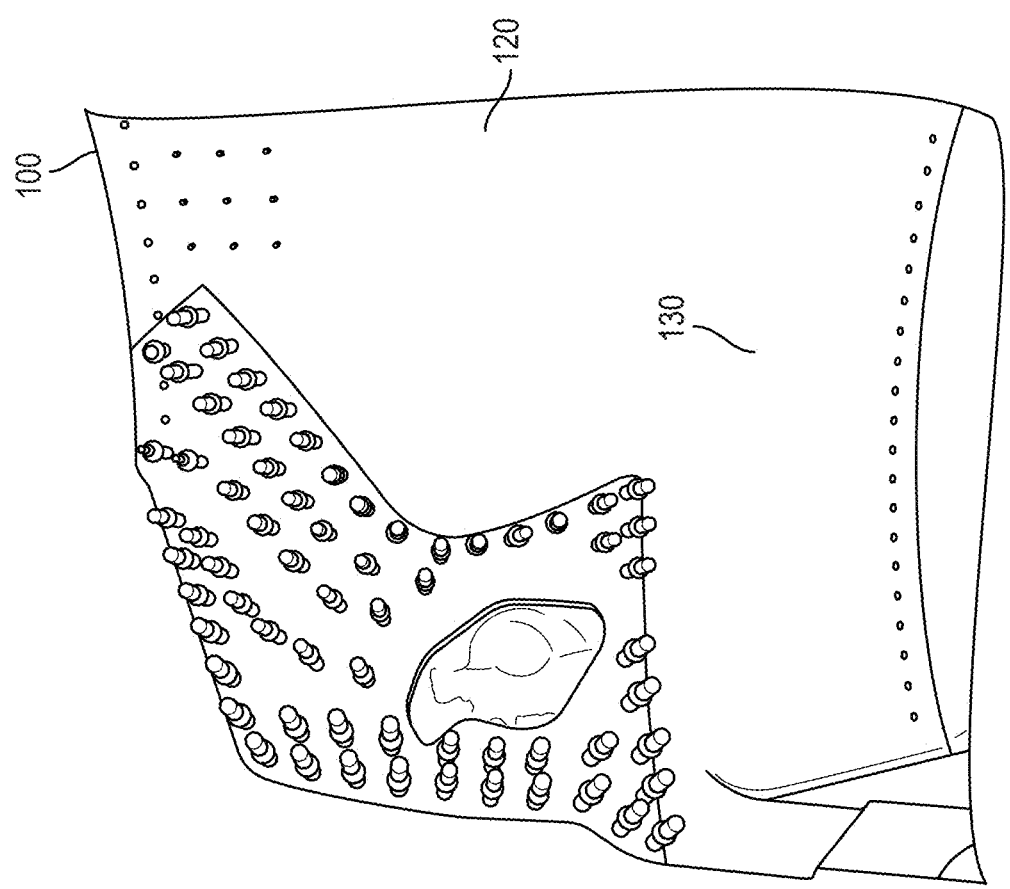
FIG. 2 is an isometric view of an exemplary part of a thrust reverser assembly, according to an embodiment of the invention.

Referring to FIGS. 1 and 2, a part 100 of a thrust reverser assembly is illustrated. For example, in some embodiments, the part 100 is one of an upper door assembly or a lower door assembly. In other embodiments, part 100 can be a machined component having corrosion damage. The part can include an inner surface 110 and an outer surface 120. The inner surface 110 and the outer surface 120 can include an outer skin 130. In order to repair corrosion damage on an area of the part 100, the part 100 is initially removed from the rest of the thrust reverser assembly. After corrosion repair has been completed, the part 100 is installed back to the thrust reverser assembly. As shown in relation to FIGS. 3A-3B, the area of the part 100 that has suffered from corrosion damage can be repaired by adding a stainless steel skin to the part 100 and sandwiching synthetic fiber material between the new skin and the part 100 to provide protection against dissimilar metal corrosion. In some embodiments, the synthetic fiber material includes Kevlar. Kevlar® is a registered trademark of DuPont de Nemours, Inc., and is DuPont's brand name for its synthetic fiber material.

Figure 3A:
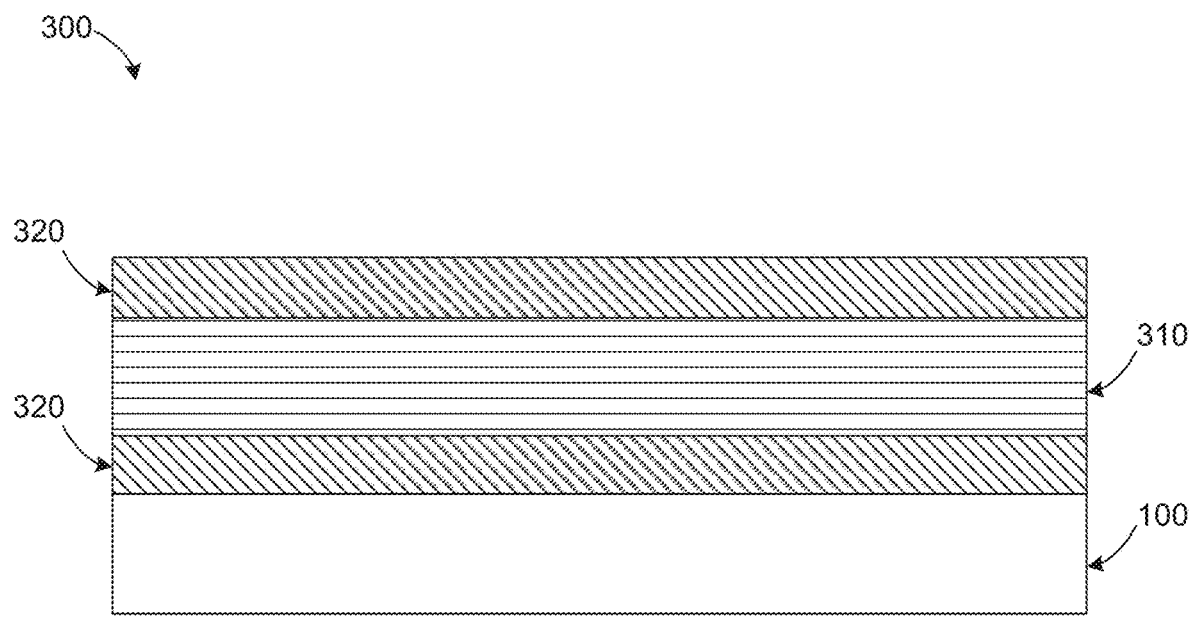
FIG. 3A is a cross-section view of an exemplary part of a thrust reverser assembly, according to an embodiment of the invention.
Figure 3B:
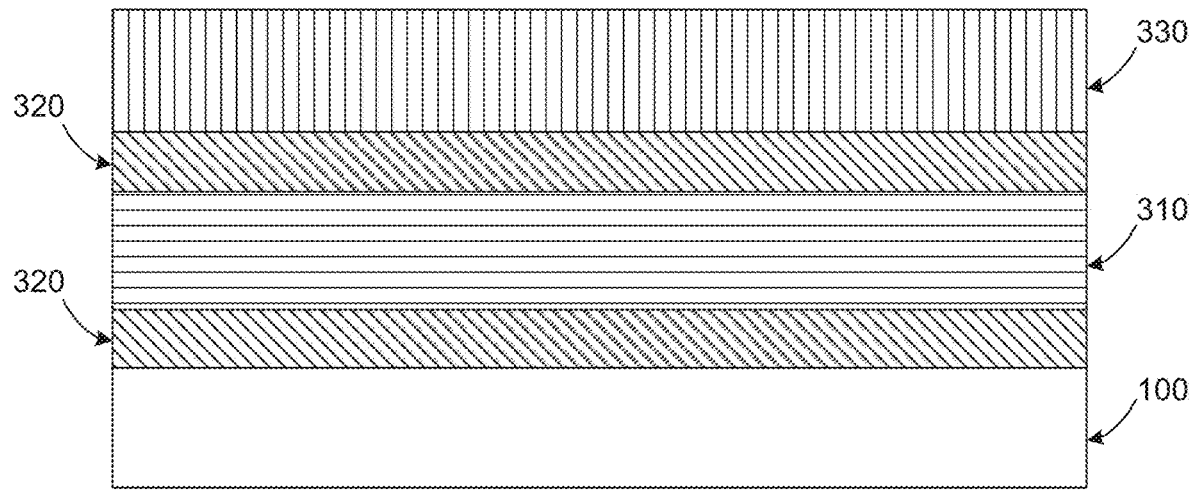
FIG. 3B is a cross-section view of an exemplary part of a thrust reverser assembly, according to an embodiment of the invention.

Before repairing the corrosion damage on the area of the part 100, the outer skin 130 is removed from the inner surface 110 and the outer surface 120. Referring to FIGS. 3A-3B, a cross-section 300 of an embodiment of part 100 after removal of the outer skin 130 is illustrated. A ply of synthetic fiber material 310 is installed onto an area of the inner surface 110 or the outer surface 120 of the part 100. The location of the installation of the ply of synthetic fiber material 310 depends on the location of the damaged area. In some embodiments, the location of the damaged area is determined during inspection of the part 100. Once installed, the ply of synthetic fiber material 310 is sandwiched between a layer of film adhesive 320 on each side of the ply of synthetic fiber material 310. In some embodiments, the synthetic fiber material includes one of a Plain Weave Kevlar or a 4-Harness Kevlar. In some embodiments, film adhesive 320 includes a 3M Scotch-Weld Structural adhesive film. AF 163 2k 0.06 is a modified epoxy structural adhesive in film form.

As mentioned during the discussion of FIGS. 1 and 2, one or more doublers can be installed onto the ply of synthetic fiber material 310 in order to provide protection against metal corrosion. In some embodiments, the one or more doublers are stainless steel. In other embodiments, the one or more doublers include another type of steel or aluminum. For example, in some embodiments, the one or more doublers 330 are installed using rivets. In some embodiments, the one or more doublers 330 are clamped onto the part 100, locations for doubler holes are identified, and the locations for doubler holes are reamed. Once the ply of synthetic fiber material 310 has been installed, the layers of film adhesive 320 can be heat cured. For example, in some embodiments, heat curing the layers of film adhesive 320 includes ramping up a temperature of the film adhesive 320 up to 250 degrees F., dwelling at the temperature of 250 degrees F. for an hour, and ramping down the temperature of the film adhesive 320 to a room temperature.

After heat curing the layers of film adhesive 320, an edge seal can be applied to gaps between the one or more doublers 330 and the inner surface 110 or outer surface 120 of the part 100. For example, in some embodiments, the edge seal includes a resin. In some embodiments, the resin includes EA 9309.3. EA 9309.3 is an epoxy that forms a permanent joint that is resistant to water. It is typically applied as an edge seal and over the doublers to ensure a moisture free barrier between the repair doublers and the original machined skin.

In some embodiments, the edge seal resin is heat cured. In some embodiments, an excess of edge seal resin is sanded down. Once the heat curing has finished and the edge seal has been applied, the outer skin 130 can be applied to the inner surface 110 and the outer surface 120 of the part 100. In some embodiments, a topcoat is painted to the inner surface 110 and the outer surface 120 of the part 100. In some embodiments, the topcoat includes CA8000 Polyurethane Topcoat. CA8000 is a Gloss Black color that is fluid resistant and has a service temperature that exceeds the operating temperature of the doors.

Figure 4:
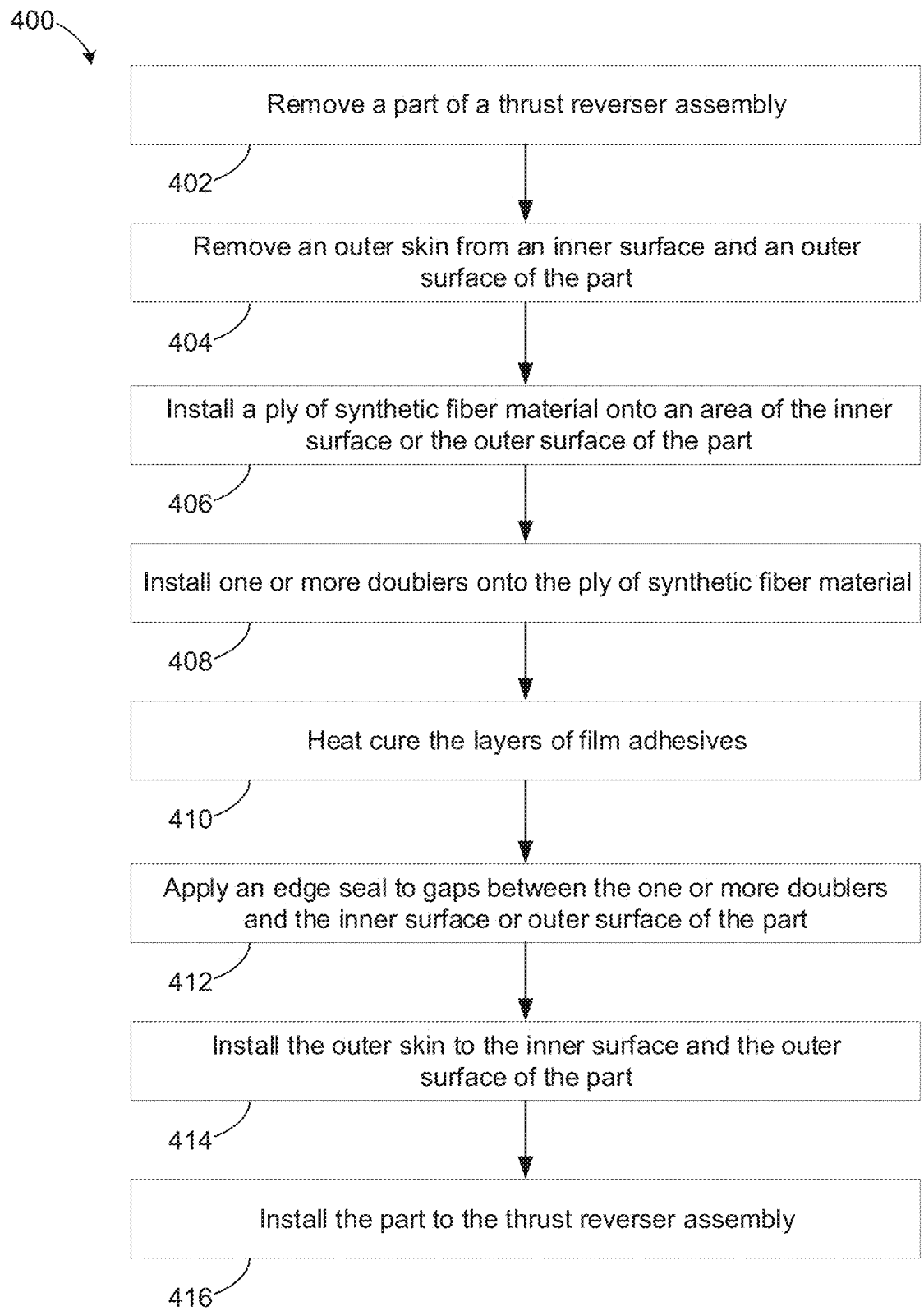
FIG. 4 is a flow diagram of method steps for repairing corrosion damage of a part of a thrust reverser assembly, according to an embodiment of the invention.

Referring to FIG. 4, a process 400 for repairing corrosion damage of a part 100 of a thrust reverser assembly is illustrated. As described in relation to FIGS. 1 and 2, the part 100 can include an inner surface 110 and an outer surface 120. The process 400 begins by removing the part 100 of the thrust reverser assembly in step 402. For example, in some embodiments, the part 100 is one of an upper door assembly or a lower door assembly. Process 400 continues by removing an outer skin 130 from the inner surface 110 and the outer surface 120 of the part 100 in step 404.

Process 400 continues by installing a ply of synthetic fiber material 310 onto an area of the inner surface 110 or the outer surface 120 of the part 100 in step 406. In some embodiments, the area includes corrosion damage. Once installed, the ply of synthetic fiber material 310 is sandwiched between a layer of film adhesive 320 on each side of the ply of synthetic fiber material 310. For example, in some embodiments, the synthetic fiber material includes one of a Plain Weave Kevlar or a 4-Harness Kevlar.

Process 400 continues by installing one or more doublers 330 onto the ply of synthetic fiber material 310 in step 408. For example, in some embodiments, the one or more doublers 330 are installed using rivets. In some embodiments, process 400 includes clamping the one or more doublers 330 onto the part 100, identifying locations for doubler holes, and reaming the locations for doubler holes.

Process 400 continues by heat curing the layers of film adhesive 320 in step 410. For example, in some embodiments, heat curing the layers of film adhesive 320 includes ramping up a temperature of the film adhesive 320 up to 250 degrees F., dwelling at the temperature of 250 degrees F. for an hour, and ramping down the temperature of the film adhesive 320 to a room temperature.

Process 400 continues by applying an edge seal to gaps between the one or more doublers 330 and the inner surface 110 or outer surface 120 of the part 100 in step 412. For example, in some embodiments, the edge seal includes a resin. In some embodiments, process 400 includes heat curing the edge seal resin. In some embodiments, process 400 includes sanding an excess of edge seal resin.

Process 400 continues by installing the outer skin 130 to the inner surface 110 and the outer surface 120 of the part 100 in step 414. Process 400 finishes by installing the part 100 to the thrust reverser assembly in step 416. In some embodiments, process 400 includes painting a topcoat to the inner surface 110 and the outer surface 120 of the part 100.

One skilled in the art will realize the invention can be embodied in other specific forms without departing from the spirit or essential characteristics thereof. The foregoing embodiments are therefore to be considered in all respects illustrative rather than limiting of the invention described herein. It will be appreciated that the illustrated embodiments and those otherwise discussed herein are merely examples of the invention and that other embodiments, incorporating changes thereto, including combinations of the illustrated embodiments, fall within the scope of the invention.

What is claimed:

1. A method for repairing corrosion damage of a part of a thrust reverser assembly, the method comprising:
   removing a part of a thrust reverser assembly, wherein the part comprises an inner surface and an outer surface;
   removing an outer skin from the inner surface and the outer surface of the part;
   installing a ply of synthetic fiber material onto an area of the inner surface or the outer surface of the part, wherein the area comprises corrosion damage,
   wherein the ply of synthetic fiber material is sandwiched between a layer of film adhesive on each side of the ply of synthetic fiber material;
   installing one or more doublers onto the ply of synthetic fiber material;
   heat curing the layers of film adhesive;
   applying an edge seal to a plurality of gaps between the one or more doublers and the inner surface or outer surface of the part;
   installing the outer skin to the inner surface and the outer surface of the part; and
   installing the part to the thrust reverser assembly.

2. The method of claim 1, wherein the part is one of an upper door assembly or a lower door assembly.

3. The method of claim 1, wherein the one or more doublers are installed using rivets.

4. The method of claim 1, wherein heat curing the layers of film adhesive comprises:
   ramping up a temperature of the film adhesive up to 250 degrees F.;
   dwelling at the temperature of 250 degrees F. for an hour;
   ramping down the temperature of the film adhesive to a room temperature.

5. The method of claim 1, wherein the edge seal comprises a resin.

6. The method of claim 5, further comprising heat curing the edge seal resin.

7. The method of claim 6, further comprising sanding an excess of edge seal resin.

8. The method of claim 1, further comprising painting a topcoat to the inner surface and the outer surface of the part.

9. The method of claim 1, further comprising:
   clamping the one or more doublers onto the part;
   identifying a plurality of locations for doubler holes; and
   reaming the plurality of locations for doubler holes.

* * * * *